United States Patent [19]

Kazami et al.

[11] Patent Number: 5,233,383

[45] Date of Patent: Aug. 3, 1993

[54] ZOOMING CONTROL DEVICE FOR A CAMERA

[75] Inventors: Kazuyuki Kazami, Tokyo; Tetsuro Goto, Funabashi; Hiroshi Sakamoto, Kawasaki, all of Japan

[73] Assignee: Nikon Corporation, Tokyo, Japan

[21] Appl. No.: 850,163

[22] Filed: Mar. 13, 1992

Related U.S. Application Data

[63] Continuation of Ser. No. 681,427, Apr. 5, 1991, abandoned, which is a continuation of Ser. No. 509,192, Apr. 16, 1990, abandoned.

[30] Foreign Application Priority Data

Apr. 19, 1989 [JP] Japan .................................. 1-99739

[51] Int. Cl.$^5$ .................... G03B 5/00; G03B 15/03; G03B 17/24
[52] U.S. Cl. ......................... 354/413; 354/419; 354/195.1; 354/106
[58] Field of Search .............. 354/105, 106, 195.1, 354/195.12, 145.1, 149.11, 410, 413, 419, 126, 127.13

[56] References Cited

U.S. PATENT DOCUMENTS

| | | |
|---|---|---|
| 3,490,844 | 1/1970 | Sapp, Jr. .................... 354/105 X |
| 4,652,104 | 3/1987 | Harvey ....................... 354/106 |
| 4,829,333 | 5/1989 | Inoue et al. ................. 354/106 X |
| 4,933,702 | 6/1990 | Komatsuzaki et al. ...... 354/419 X |
| 4,943,825 | 7/1990 | Taniguchi et al. .......... 354/106 X |
| 4,944,030 | 7/1990 | Haraguchi et al. ......... 354/195.12 X |
| 4,975,724 | 12/1990 | Hirasawa et al. .......... 354/195.1 X |
| 4,984,005 | 1/1991 | Kazami et al. ............. 354/419 X |
| 5,097,279 | 3/1992 | Sakamoto et al. .......... 354/106 |

Primary Examiner—W. B. Perkey
Attorney, Agent, or Firm—Shapiro and Shapiro

[57] ABSTRACT

A camera is so structured that trimming photographing in which the F-number of the photographing optical system does not change is preferentially selected for the zoom-up photographing of a dark object field, so that the shutter time does not extend unnecessarily and the risk of hand-vibrated photographing is reduced.

8 Claims, 6 Drawing Sheets

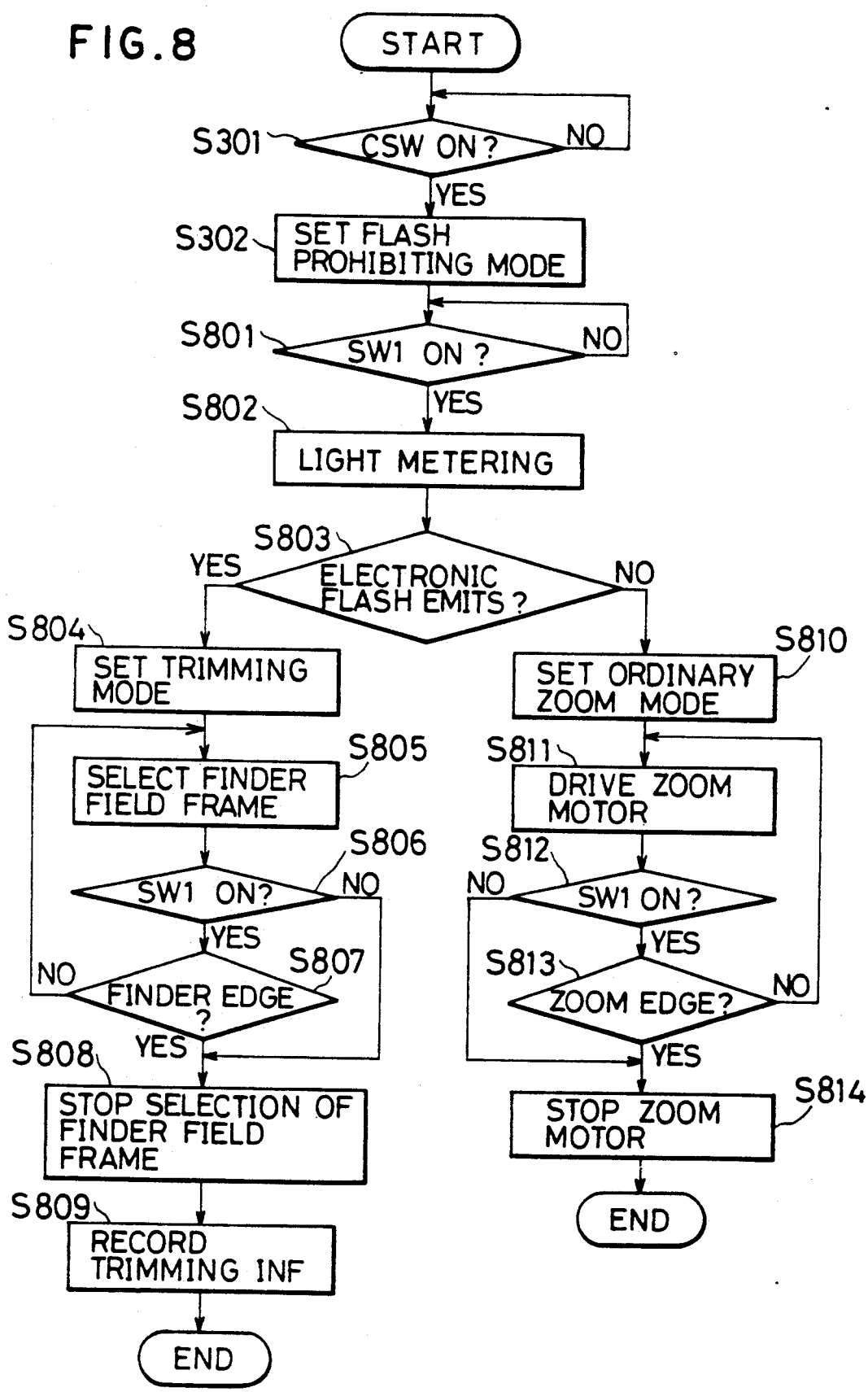

5,233,383

ZOOMING CONTROL DEVICE FOR A CAMERA

This is a continuation of application Ser. No. 681,427 filed Apr. 5, 1991; which is a continuation of application Ser. No. 509,192 filed Apr. 16, 1990, both of which are now abandoned.

BACKGROUND OF THE INVENTION

1. Field of the Invention

The present invention relates to an automatic exposure controlled camera capable of trimming photographing.

2. Related Background Art

A bi-focal camera or a camera having a zoom lens, which can vary a focal distance of a photographing lens has been known.

A camera which automatically sets an electronic flash mode when an object field is dark and permits setting of electronic flash inhibit mode in case where the photographing with the electronic flash is prohibited such as in an art gallery, has also been known.

In the prior art, when the electronic flashing is forcibly inhibited in a place where the photographing with the electronic flash is prohibited and a size of an object on a screen is changed by zooming, for example, by zooming-up for telephoto photographing, an F-number of a photographing optical system increases (lense becomes dark). As a result, a shutter time which is automatically controlled becomes long and there is a risk of vibration of the camera during the photographing.

The present invention recognizes the above problem, and it is an object of the present invention to provide a camera which minimizes a risk of hand-vibrated photographing when the object field is dark but the electronic flash is not used and zoom-up photographing is performed.

SUMMARY OF THE INVENTION

In order to achieve the above object, in accordance with the present invention, trimming photographing in which the F-number of the photographing optical system does not change is preferentially effected for the zoom-up photographing of a dark object field.

In the present invention, for the photographing of the dark object field, the trimming photographing in which the F-number does not change is preferentially selected in response to the zooming operation. Accordingly, the shutter time does not extend unnecessarily and the risk of hand-vibrated photographing is reduced.

BRIEF DESCRIPTION OF THE DRAWINGS

FIG. 8 shows a flow chart for illustrating an operation of the embodiment.

DESCRIPTION OF THE PREFERRED EMBODIMENTS

Figure 1:
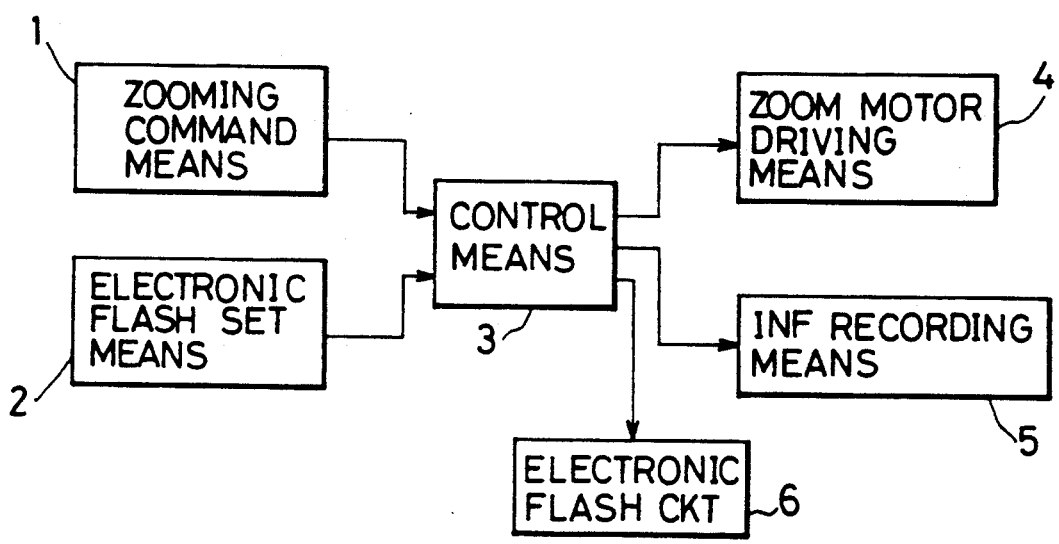
FIG. 1 shows a block diagram of a concept of the present invention.

FIG. 1 shows a block diagram which illustrates a concept of an embodiment to be described below.

Signals from zooming command means 1 which responds to an external operation and electronic flash mode set means 2 for switching an electronic flash mode are applied to control means 3. The control means 3 supplies control signals to zoom motor drive means 4 which changes a focal distance of the photographing lens by motor control, record means 5 for recording selected trimming information on a film or a film container, and an electronic flash circuit 6.

In response to inputs from the zooming command means 1 and the electronic flash setting means 2, the control means 3 controls the zoom motor drive means 4, the information record means 5 and the electronic flash circuit 6.

Figure 2:
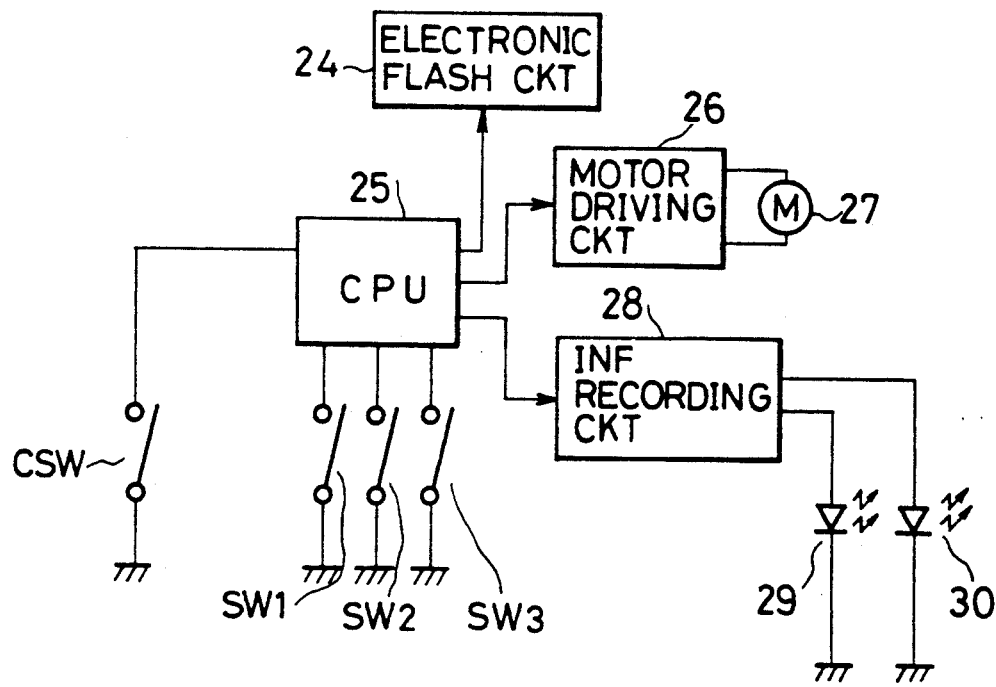
FIG. 2 shows a block diagram of a first embodiment of the present invention.

FIG. 2 shows an embodiment of the present invention applied to an automatic exposure controlled camera which is programmed to change a shutter speed in accordance with the brightness of the object field or of an iris preference type and which automatically sets the electronic flash mode when the object field is dark.

Four switches are connected to a central processing unit (CPU). CSW denotes a switch which selects the electronic flash mode, more particularly, inhibits the electronic flash. In the present embodiment, the electronic flash is inhibited when the switch is ON.

Switches SW1 and SW2 are linked to the zooming operation. When the switch SW1 is ON, the zoom-up operation is performed, and when the switch SW2 is ON, the zoom-down operation is performed. A switch SW3 is a release switch which is responsive to the release of a shutter.

A signal is supplied from the CPU 25 to the electronic flash circuit 24 to supply information as to whether the electronic flash is fired or not depending on the status of CSW.

The CPU 25 also controls a motor drive circuit 26 which drives the zoom motor 27 in accordance with the switches SW1 and SW2. The motor 27 drives the zoom lens which function as a photographing optical system (photographing lens) to change a focal distance.

The CPU 25 further supplies a signal to an information record circuit 28. When the CPU 25 selects the trimming photographing in response to the actuation of CSW and the switches SW1 and SW2, the information record circuit 28 records the trimming information on a film by LED's 29 and 30.

The trimming information designates an area in a photographing image which is to be enlarge-printed. The trimming information recorded on the film is read out in a print stage in a laboratory, and the area designated by the trimming information is enlarge-printed to a normal one-frame print size. Accordingly, the photograph print printed in accordance with the trimming information appears as if it were photographed by the zoom-up photographing optical system.

The recording of the information on the film is not limited to optical recording on the film by the LED. For example, it may be magnetically recorded on a film container (film container)

Figure 3:
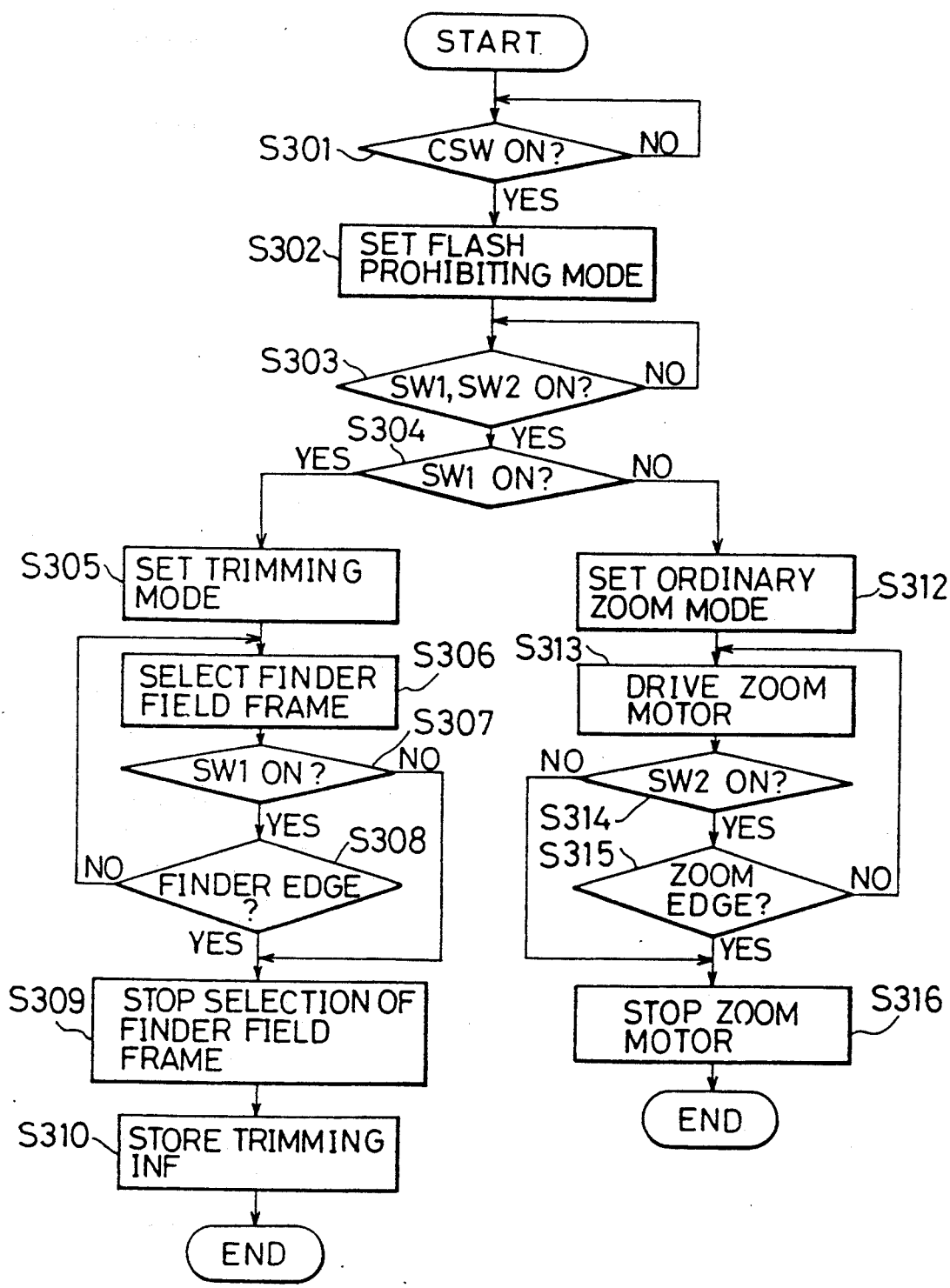
FIG. 3 shows a flow chart for illustrating the operation of the first embodiment, FIG. 4 illustrate a display status of a view field frame viewable in a finder.

FIG. 3 shows a flow chart of the CPU 25 which illustrates the operation of the embodiment of FIG. 2.

When the switch CSW is not ON, the CPU 25 sends a signal to the motor drive circuit 26 in response to the actuation of the switches SW1 and SW2 to drive the zoom motor 27. Thus, the photographing optical system is driven and desired zooming is carried out.

When the object field is dark, the CPU 25 automatically activates the electronic flash circuit 24 to effect the electronic flashing.

In a step S301, the ON status of CSW is monitored. When the electronic flash inhibit mode is selected, the flow starts the operation. In the present embodiment, when the object field is dark, the electronic flash is automatically fired. Accordingly, when the electronic flash inhibit mode is selected, it is determined that the electronic flash photographing is not performed in spite of dark object field.

If the decision in the step S301 is affirmative, that is, if CSW is ON, the process proceeds to a step S302 where the electronic flash inhibit mode in which the automatic electronic flash is inhibited is set. In a step S303, the actuation of the zoom switches SW1 and SW2 is monitored. If one of the switches SW1 and SW2 is ON in the step S303, which one of the switches SW1 and SW2 is ON is determined in the step S304. If the switch SW1 is ON, the process proceeds to a step S305, and if the switch SW1 is OFF, that is, if the switch SW2 is ON, the process proceeds to a step S312.

When the switch SW1 is ON, the zoom-up is designated. In this case, since the electronic flash inhibit mode has been set, the electronic flash is not fired in spite of the dark object field. Accordingly, in the auto-exposure camera of the present embodiment, a shutter time becomes long. As a result, the hand-vibration likely occurs during photographing. In the present embodiment, therefore, the trimming mode which does not cause the change of F-number, that is, a mode in which the trimming information is recorded on the film without driving the photographing optical system is selected. In a step S305, this trimming mode is set.

Figure 4:
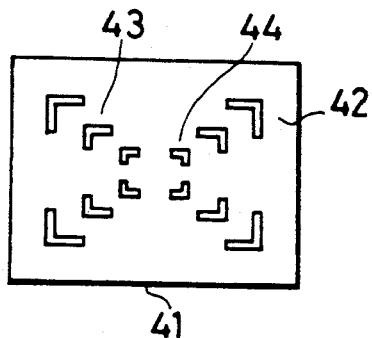

Steps S306-S308 relate to the zoom-up operation in the trimming mode. The operation is continued from the turn-on of the switch SW1 until the zoom-up reaches the finder end. The finder process is shown in FIG. 4. A view frame is changed in response to the zooming operation of the trimming mode. It changes from 42 to 43 and 44 in sequence as the zoom-up operation is performed.

When the switch SW1 is turned off or when the selected view frame is the minimum frame 44, the process proceeds to a step S309 where the finder processing is stopped.

In a step S310, the CPU 25 stores the trimming value corresponding to the current view frame as the information.

In a step S312, the normal zoom mode in which the photographing optical system is driven is set since the zoom-down is required in the electronic flash inhibit mode, the optical system is driven to reduce the F-number, that is, make the lens brighter.

Steps S313-S315 relate to the zoom-down operation. When the zoom-down switch SW2 is turned off or when the zoom end (wide end in this case) is reached, a signal is sent to the motor drive circuit 26. In a step S316, the zoom motor 27 is stopped and the zooming operation of the photographing optical system is terminated.

Figure 5:
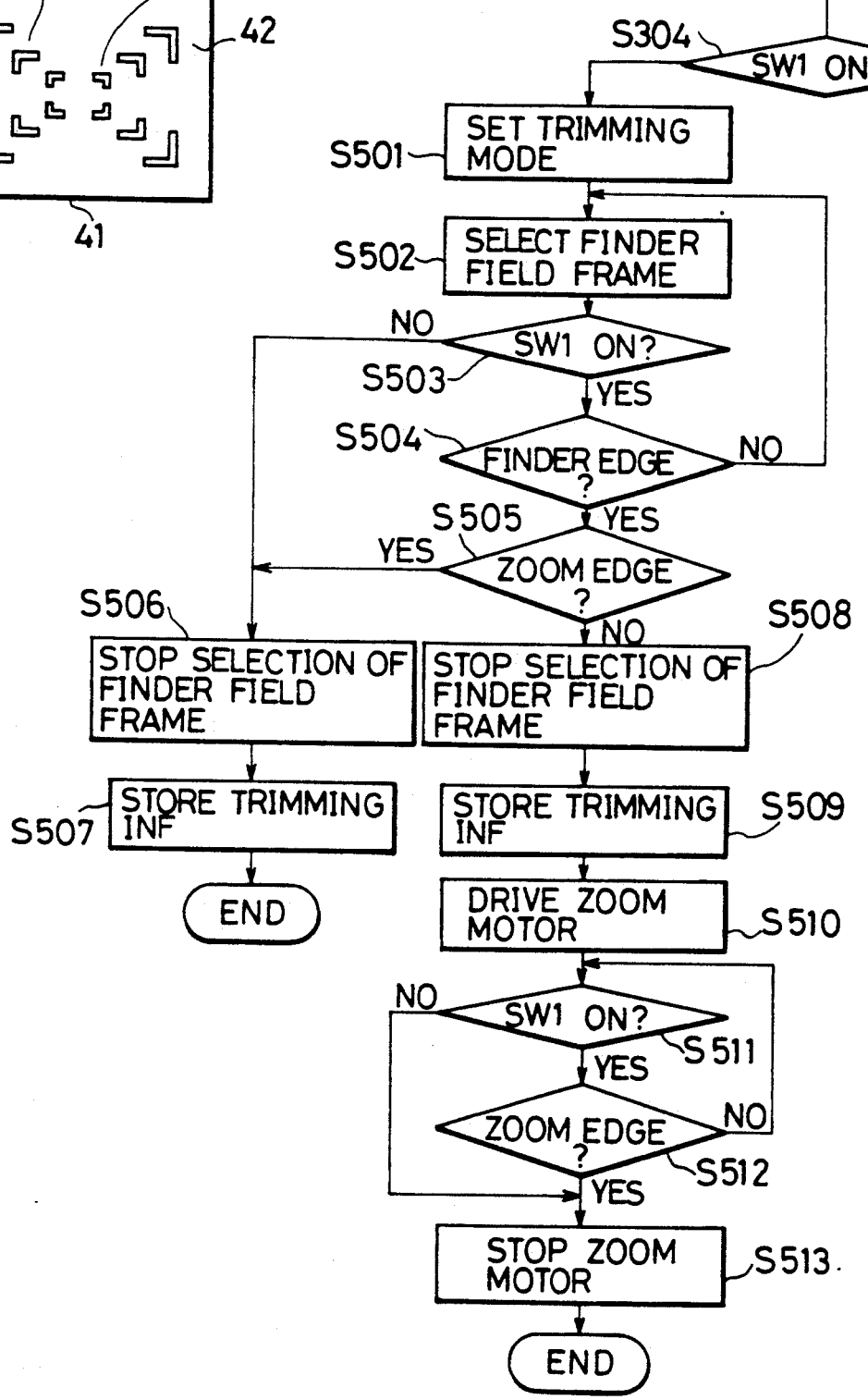
FIG. 5 shows flow chart for illustrating an operation of a modification of the first embodiment.

FIG. 5 shows a modification of the above embodiment. When the zoom-up operation is performed in the electronic flash inhibit mode, the trimming mode is preferentially selected. If further zoom-up is required at the limit of trimming, the normal zoom-up by the zooming operation of the photographing optical system is carried out.

In the modification, the operation up to the step S304 is similar to that of the above embodiment. Then, the steps S501 et sec are carried out. The steps S501-S504 are the same as the step S305-S308 of the embodiment of FIG. 3, the steps S506 and S507 are the same as the steps S309 and S310 of the embodiment of FIG. 3, and the steps S508 and S509 are the same as the step S309 and S310 of the embodiment of FIG. 3.

In the present embodiment, however, when the finder end is reached in the trimming mode, whether the photographing optical system is at the zoom end, that is, the limit position at the telephoto end is determined in a step S505.

If the photographing optical system is not at the zoom end, the finder processing is stopped in a step S508 and the trimming information is stored in a step S509.

In a step S510, a signal is sent to the motor drive circuit 26 to drive the motor 27. Thus, the photographing optical system is driven for zooming up.

In a step S511, whether the switch SW1 is ON or not is determined. In a step S512, whether the photographing optical system has reached the zoom end or not is determined. The steps S511 and S512 are repeated until it reaches the zoom end.

When the photographing optical system reaches the zoom end or if the switch SW1 is turned off in the course of reaching the zoom end, a signal is sent to the motor drive circuit 2 in a step S513 to stop the motor 27.

Figure 6:
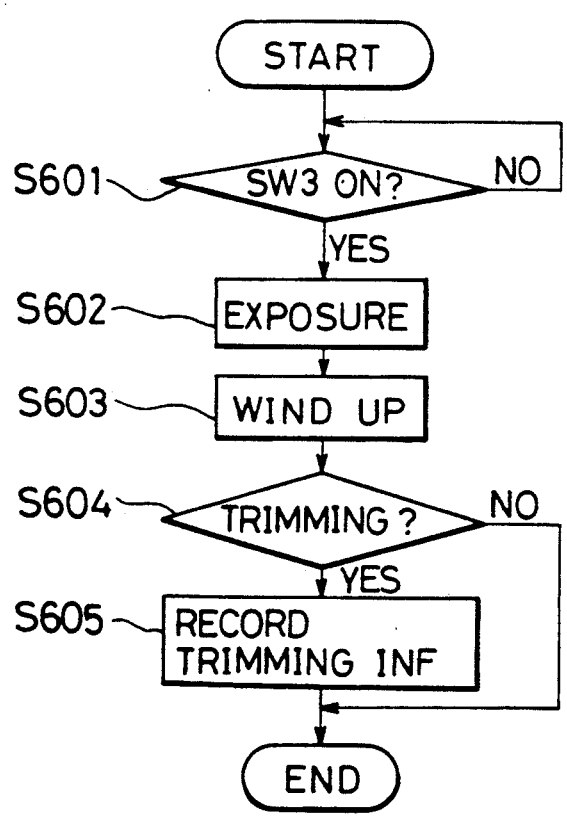
FIG. 6 shows a flow chart for illustrating the operation due to a release switch SW3.

FIG. 6 shows a process flow of the operation of the switch SW3 or the release switch. In a step S601, the input of the switch SW3 is monitored. When the switch SW3 is turned on, it is determined that the shutter has been released and an exposure process is executed in a step S602, and the film is wound up in a step S603.

In a step S604, whether the photographing is in the trimming mode or not is determined. If it is the trimming mode, the trimming information is recorded on the film or film container in a step S605. This information is utilized when the printing is done in the laboratory.

Figure 7:
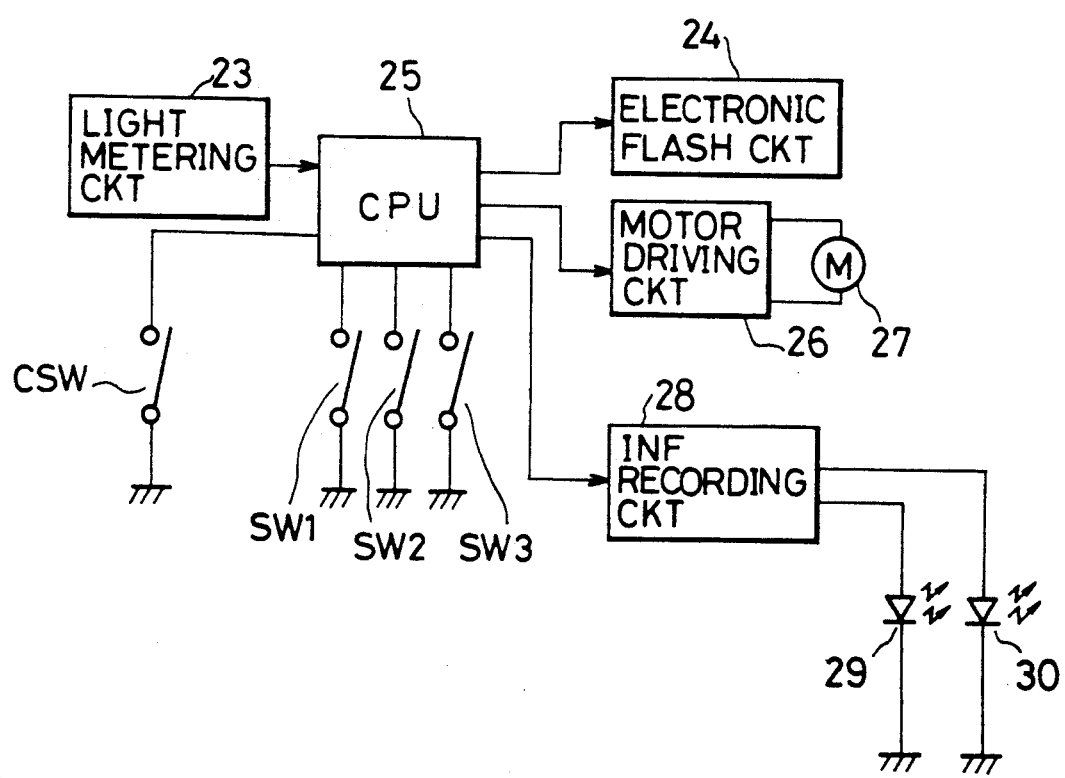
FIG. 7 shows a block diagram of a second embodiment of the invention.

FIG. 7 shows a second embodiment of the present invention.

A difference from the embodiment of FIG. 2 resides in that a signal from a light metering circuit is supplied to the CPU 25. The operation is explained with reference to a flow chart of FIG. 8. Basically, it is the same as that of FIG. 3 but modified portions are designated by new numerals.

The steps S301 and S302 are the same as those of the embodiment of FIG. 3.

In a step S801, the zoom-up entry by the switch SW1 after the electronic flash inhibit mode has been set is monitored. When the zoom-up input, that is, the ON status of the switch SW1 is detected, the process proceeds to a step S802. When the switch SW1 is off, the operation is repeated until the switch SW1 is turned on.

In the step S802, the light metering is performed. The light metering operation is carried out based on exposure factors such as object field brightness and film sensitivity.

In a step S803, whether the object field brightness requires the firing of the electronic flash or not is determined.

If it is determined in the step S803 that the firing of the electronic flash is required, the process proceeds to a step S804 to select the trimming mode. If it is determined in the step S803 that the firing of the electronic flash is not required, the process proceeds to a step S810 to select a normal zoom mode.

If it is determined in the step S803 that the firing of the electronic flash is required, it means that the object field is quite dark. Thus, the shutter time is long. If the photographing optical system is driven in the zoom-up direction, the F-number increases and the lens becomes darker. As a result, the shutter time becomes longer. As a result, the hand-vibration during photographing is very likely to occur. In view of the above, in the present embodiment, the trimming mode is selected in order to avoid increasing the F-number.

On the other hand, when it is determined in the step S803 that the firing of the electronic flash is not required, it means that the object field is bright, and the shutter time is short. Accordingly, even if the photographing optical system is driven in the zoom-up direction to increase the F-number, the shutter time will not be so long as to cause the hand vibration during photographing. Accordingly, in the present embodiment, the normal zoom mode is selected.

The steps S804-S809 when the trimming mode is selected are the same as the steps S305-S310 of the embodiment of FIG. 3.

When the normal zoom mode is selected, the CPU 25 drives the photographing optical system by the motor 27 in a step S810.

In a step S811, the zoom motor 27 is driven for zooming up.

In a step S812, whether the switch SW1 is ON or not is determined.

If the switch SW1 is ON, the process proceeds to a step S813 where whether the photographing optical system has reached the zoom end or not is determined.

If it is determined that it has reached the zoom end, the zoom motor 27 is stopped through the motor drive circuit 26.

If the switch SW1 is not ON in the step S812, in other words, if it is OFF, the process proceeds to a step S814 to stop the motor 27.

If it is determined in the step S813 that the photographing optical system has not reached the zoom end, the process returns to the step S811.

The zoom motor 27 is driven until the switch SW1 is turned off or the photographing optical system reaches the zoom end.

In the present embodiment, when the electronic flash inhibit mode is not selected, the CPU 25 sends a signal to the motor drive circuit 26 in accordance with the actuation of the switches SW1 and SW2 to drive the motor 27 in order to drive the photographing optical system. Thus, the zooming operation is performed in accordance with the switches SW1 and SW2. So long as the electronic flash inhibit mode is not selected, the CPU 25 automatically activates the electronic flash circuit 24 when the object field is dark to fire the electronic flash.

In the present embodiment, again, the trimming information stored in the CPU 25 is recorded on the film or film container in the same manner as that shown in FIG. 6.

The camera of the type in which the electronic flash is automatically fired has been described so far. The present invention is also applicable to an auto-exposure controlled camera in which the electronic flash is not automatically fired.

For example, in the embodiment of FIG. 8, the steps S301 and S302 may be omitted, and when the object field is dark, the step S803 to S809 may be executed, and when the object field is bright, the steps S810 to S814 may be executed.

In accordance with the present invention, either one of the trimming mode and the normal zoom mode may be automatically selected depending on the status of the object field so that the hand-vibrated photographing is prevented.

We claim:

1. A camera comprising:
   focal distance setting means operable to change a focal distance;
   photographing optical system drive means for driving a photographing optical system to change the focal distance;
   area setting means for setting an area in a photographing image which is to be enlarge-printed;
   light metering means for detecting a brightness of an object field; and
   control means responsive to an output of said light metering means for activating said photographing optical system drive means in response to the operation of said focal distance setting means when the object field is brighter than a predetermined level and activating said area setting means in place of said photographing optical system drive means in response to the operation of said focal distance setting means when the object field is darker than the predetermined level.

2. In a camera including focal distance setting means operable to change a focal distance and a photographing optical system driving means for driving a photographing optical system in response to the operation of said focal distance setting means to change the focal distance and having a mode of automatically firing an electronic flash in accordance with a brightness of an object field,
   control device for said camera comprising:
   area setting means for setting an area in a photographing image which is to be enlarge-printed;
   mode setting means for forcibly disabling an automatic electronic flash firing mode; and
   control means for activating said area setting means in place of said photographing optical system drive means in response to the operation of said focal distance setting means when said mode setting means is activated.

3. A device according to claim 2, wherein said control means causes said drive means to drive said photographing optical system in the direction of the telephoto end and causes said area setting means to set the area in a photographing image in the direction of a minimum area.

4. A camera capable of performing an electronic flash photographing operation, comprising:
   driving means for driving a photographing optical system to change the focal distance of said photographing optical system;
   operating means to be operated, said driving means driving the photographing optical system in the direction of the telephoto end in response to a first operation of said operating means and driving the photographing optical system in the direction of the wide end in response to a second operation of said operating means;

area changing means for changing an area in a photographing image which is to be enlarge-printed;

mode setting means for forcibly disabling the electronic flash photographing operation; and control means for causing said area changing means to set the area in the photographing image in response to said first operation and causing said driving means to drive the photographing optical system in response to sad second operation when said mode setting means is activated.

5. A camera according to claim 4, wherein said control means causes said area changing means to change the area in the direction of a minimum area in response to said first operation and causes sad driving means to drive the photographing optical system in the direction of the wide end in response to said second operation.

6. A camera comprising:

light metering means for detecting a brightness of an object field and producing a brightness signal;

driving means for driving a photographing optical system to change the focal distance of said photographing optical system;

area changing means for changing an area in a photographing image which is to be enlarge-printed; and control means based on said brightness signal for selecting one of said driving means and said area changing means and activating the selected one.

7. A camera according to claim 6, which further comprises operating means to be operated, wherein said driving means drives said photographing optical system in the direction of the telephoto end in response to the operation of the operating means.

8. A camera comprising:

focal distance setting means operable to set a focal distance;

photographing optical system drive means for driving a photographing optical system to change the focal distance of said photographing optical system;

area setting means for setting an area in a photographing image which is to be enlarge-printed;

light metering means for detecting brightness of an object field; and control means responsive to an output of said light metering means for selecting one of said photographing optical system drive means and said area setting means and activating the selected means when said focal distance setting means is operated.

* * * * *